United States Patent
Hazzani et al.

(10) Patent No.: US 9,247,216 B2
(45) Date of Patent: Jan. 26, 2016

(54) SYSTEMS AND METHODS FOR VIDEO- AND POSITION-BASED IDENTIFICATION

(75) Inventors: Gideon Hazzani, Rishon le Zion (IL); Arie Briness, Haifa (IL)

(73) Assignee: VERINT SYSTEMS LTD., Herzelia, Pituach (IL)

( * ) Notice: Subject to any disclaimer, the term of this patent is extended or adjusted under 35 U.S.C. 154(b) by 972 days.

(21) Appl. No.: 12/840,227

(22) Filed: Jul. 20, 2010

(65) Prior Publication Data

US 2011/0018995 A1 Jan. 27, 2011

(30) Foreign Application Priority Data

Jul. 26, 2009 (IL) .......................................... 200065

(51) Int. Cl.
| | |
|---|---|
| H04N 7/18 | (2006.01) |
| G08B 13/196 | (2006.01) |
| H04L 29/06 | (2006.01) |
| H04W 4/02 | (2009.01) |
| H04W 64/00 | (2009.01) |

(52) U.S. Cl.
CPC .......... *H04N 7/181* (2013.01); *G08B 13/19645* (2013.01); *G08B 13/19697* (2013.01); *H04L 63/30* (2013.01); *H04W 4/02* (2013.01); *H04W 64/00* (2013.01)

(58) Field of Classification Search
CPC ....................................................... H04N 7/18
USPC ................................................. 348/143, 169
See application file for complete search history.

(56) References Cited

U.S. PATENT DOCUMENTS

| | | | |
|---|---|---|---|
| 8,385,883 | B2 * | 2/2013 | Rajan et al. .................... 455/411 |
| 2003/0032436 | A1 | 2/2003 | Mikuni |
| 2004/0169587 | A1 | 9/2004 | Washington |
| 2006/0197839 | A1 * | 9/2006 | Senior et al. .................. 348/169 |
| 2007/0268392 | A1 | 11/2007 | Paalasmaa et al. |
| 2008/0031213 | A1 * | 2/2008 | Kaiser et al. .................. 370/338 |
| 2008/0240616 | A1 | 10/2008 | Haering et al. |
| 2009/0054077 | A1 | 2/2009 | Gauthier et al. |

(Continued)

FOREIGN PATENT DOCUMENTS

| | | |
|---|---|---|
| DE | 19920222 A1 | 11/2000 |
| EP | 1924117 A2 | 5/2008 |
| WO | 2010116292 A2 | 10/2010 |

OTHER PUBLICATIONS

3GPP TS 24.008 v3.8.0, "3rd Generation Partnership Project; Technical Specification Group Core Network; Mobile radio interface layer 3 specification; Core Network Protocols—Stage 3," Release 1999, (Jun. 2001), 442 pages.

(Continued)

*Primary Examiner* — David Lazaro
*Assistant Examiner* — Marie Georges Henry
(74) *Attorney, Agent, or Firm* — Meunier Carlin & Curfman (57) ABSTRACT

A system having interfaces to receive images from one or more cameras and location information with respect to wireless communication terminals. A notification may be received regarding an individual observed in the images. Next, wireless communication terminals located in a vicinity of the individual may be identified. From the identified wireless communication terminals, identification information applicable to the individual may be obtained. The identification information may be, e.g., personal information related to a subscriber of the given wireless communication terminal.

9 Claims, 4 Drawing Sheets

(56) References Cited

U.S. PATENT DOCUMENTS

2009/0186596 A1* 7/2009 Kaltsukis .................. 455/404.2
2011/0134240 A1* 6/2011 Anderson et al. ............. 348/143

OTHER PUBLICATIONS

Asokan, N., et al., "Man-in-the-Middle in Tunneled Authentication Protocols," Draft version 1.3 (latest public version: http://eprint.iacr.org/2002/163/, Nov. 11, 2002, 15 pages.

ETSI TS 102 657 v1.4.1, "Lawful Interception (LI); Retained data handling; Handover interface for the request and delivery of retained data," Dec. 2009, 92 pages.

Girardin, Fabien, et al., "Detecting air travel to survey passengers on a worldwide scale," Journal of Location Based Services, 26 pages.

Strobel, Daehyun, "IMSI Catcher," Seminararbeit Ruhr-Universitat Bochum, Chair for Communication Security, Prof. Dr.-Ing. Christof Paar, Jul. 13, 2007, 28 pages.

Meyer, Ulrike, et al., "On the Impact of GSM Encryption and Man-in-the-Middle Attacks on the Security of Interoperating GSM/UMTS Networks," IEEE, 2004, 8 pages.

Vedaldi, Andrea, "An implementation of SIFT detector and descriptor," University of California at Los Angeles, 7 pages.

Kruegle, Hermann, "CCTV Surveillance, Chapter 1: Video's Critical Role in the Security Plan," Elsevier, Jan. 1, 2007, 92 pages.

* cited by examiner

SYSTEMS AND METHODS FOR VIDEO- AND POSITION-BASED IDENTIFICATION

FIELD OF THE DISCLOSURE

The present disclosure relates generally to surveillance systems, and particularly to methods and systems for combining video surveillance and location tracking information.

BACKGROUND OF THE DISCLOSURE

Video surveillance systems are deployed and operated in various applications, such as airport security, crime prevention and access control. In a typical video surveillance application, multiple video cameras acquire video footage, which is viewed and/or recorded at a monitoring center.

Mobile communication networks deploy various techniques for measuring the geographical locations of wireless communication terminals. Such techniques are used, for example, for providing Location Based Services (LBS) and emergency services in cellular networks. Some location tracking techniques are based on passive probing of network events generated by the wireless terminals. Other techniques are active, i.e., proactively request the network or the terminal to provide location information.

SUMMARY OF THE DISCLOSURE

An embodiment that is described herein provides a system, including:

a first interface, which is operative to receive images from one or more cameras;

a second interface, which is operative to receive location information with respect to wireless communication terminals; and a processor, which is configured to accept a notification pointing to an individual observed in the images, to identify, based on the location information received via the second interface, one or more of the wireless communication terminals located in a vicinity of the individual, and to obtain identification information applicable to the individual based on at least one of the identified wireless communication terminals.

In some embodiments, the notification indicates a position within the images in which the individual is observed, and the processor is configured to translate the position into an estimated geographical location of the individual and to identify the wireless communication terminals in the vicinity of the individual based on the estimated geographical location. In an embodiment, the processor is configured to extract identity attributes of one or more of the identified wireless communication terminals from the location information, and to retrieve the identification information responsively to the extracted identity attributes. The identity attributes may include an International Mobile Subscriber Identity (IMSI) and/or a Temporary Mobile Subscriber Identity (TMSI).

In a disclosed embodiment, the processor is configured to retrieve the identification information by querying a remote database with the identity attributes. In an embodiment, the identification information of a given wireless communication terminal includes personal information related to a subscriber of the given wireless communication terminal. In another embodiment, the processor is configured to present at least some the identification information to an operator.

There is additionally provided, in accordance with an embodiment of the present invention, a system, including:

one or more cameras, which are operative to produce images;

an operator terminal, which is configured to display the images to an operator and to accept from the operator a notification pointing to an individual observed in the images; and a processor, which is configured to accept location information with respect to wireless communication terminals, to identify, based on the location information, one or more of the wireless communication terminals located in a vicinity of the individual, and to obtain identification information applicable to the individual based on at least one of the identified wireless communication terminals.

In an embodiment, the system further includes an interface, which is operative to receive the location information from at least one communication network with which the wireless communication terminals communicate. In another embodiment, the system includes one or more interrogation devices, which are detached from any communication network with which the wireless terminals communicate, and which are configured to establish communication with the wireless communication terminals in the vicinity of the individual so as to produce the location information, and to provide the location information to the processor.

In yet another embodiment, the interrogation devices are configured to extract from the communication identity attributes of the wireless communication terminals in the vicinity of the individual and to provide the identity attributes to the processor, and the processor is configured to retrieve the identification information responsively to the extracted identity attributes. The identity attributes may include an International Mobile Subscriber Identity (IMSI) and/or a Temporary Mobile Subscriber Identity (TMSI). In some embodiments, each interrogation device is associated with a respective camera, and has a coverage area that matches a field-of-view of the camera.

In a disclosed embodiment, when the individual appears in the images produced by multiple cameras, the processor is configured to present the identification information of a given wireless communication terminal only if the given wireless communication terminal established communication with at least two of the interrogation devices associated with the cameras in which the individual appears. In an embodiment, the processor is configured to present at least some the identification information to the operator using the operator terminal.

There is further provided, in accordance with an embodiment of the present invention, a method, including:

accepting images from one or more cameras;

accepting location information with respect to wireless communication terminals;

accepting from an operator a notification pointing to an individual observed in the images;

identifying, based on the location information, one or more of the wireless communication terminals located in a vicinity of the individual;

obtaining identification information applicable to the individual based on at least one of the identified wireless communication terminals; and presenting at least some of the identification information to the operator.

The present disclosure will be more fully understood from the following detailed description of the embodiments thereof, taken together with the drawings in which:

DETAILED DESCRIPTION OF EMBODIMENTS

Overview

Video surveillance systems typically collect video images from multiple video cameras, and present the images to a control center operator. The operator may observe events of interest in the images and take appropriate actions. Events that may trigger responsive action may comprise, for example, suspected criminal or terrorist activities. In many cases, events of interest involve individuals that are observed in the images. In known surveillance systems, however, the operator usually has no information as to the identity of the observed individuals. Such identity information is sometimes crucial for handling the event, e.g., for deciding on the appropriate responsive action.

Embodiments that are described herein provide improved methods and systems for video surveillance, which give the operator identification information regarding individuals that are observed in video images. The identification information is produced by detecting one or more wireless communication terminals (e.g., cellular phones) that are located in the vicinity of the observed individual and are therefore likely to belong to the individual. Identification information associated with these terminals or their subscribers is obtained and presented to the operator.

In some embodiments, a surveillance system comprises a video surveillance subsystem that presents video images, a location tracking subsystem that measures locations of wireless terminals, and a correlation processor that correlates the information provided by the two subsystems. In a typical flow, the operator points to an individual of interest observed in the images, such as by clicking a mouse over the individual in the displayed video images. The correlation processor determines the geographical location of the individual, and identifies one or more wireless terminals located in the vicinity of this geographical location based on location information provided by the location tracking subsystem. The correlation processor obtains identification information related to those terminals, and presents the information to the operator. When the individual of interest is viewed by multiple cameras, the correlation processor may focus on wireless terminals that are identified in the fields-of-view of two or more cameras, in order to reduce the likelihood of false identification.

The methods and systems described herein provide a powerful enhancement to video surveillance systems. When using the disclosed techniques, the operator is provided with identity information (e.g., name and phone number) of the observed individual in real time. As a result, responsive actions can be more effective, since they can be adapted to the specific identity of the individual.

In some embodiments, the location tracking subsystem comprises a set of wireless interrogation devices. Each interrogation device is able to query identity attributes (e.g., International Mobile Subscriber Identity—IMSI) of wireless terminals in its coverage area. The coverage areas of the interrogation devices typically correspond to the fields-of-view of the cameras, so that detected wireless terminals are likely to correspond to individuals observed in the images.

Additionally or alternatively, the location tracking subsystem may obtain the identity attributes from the wireless network with which the terminals communicate. The identity attributes may be obtained using passive probing techniques or using active location techniques. Several example system configurations are described herein.

System Description

Figure 1:
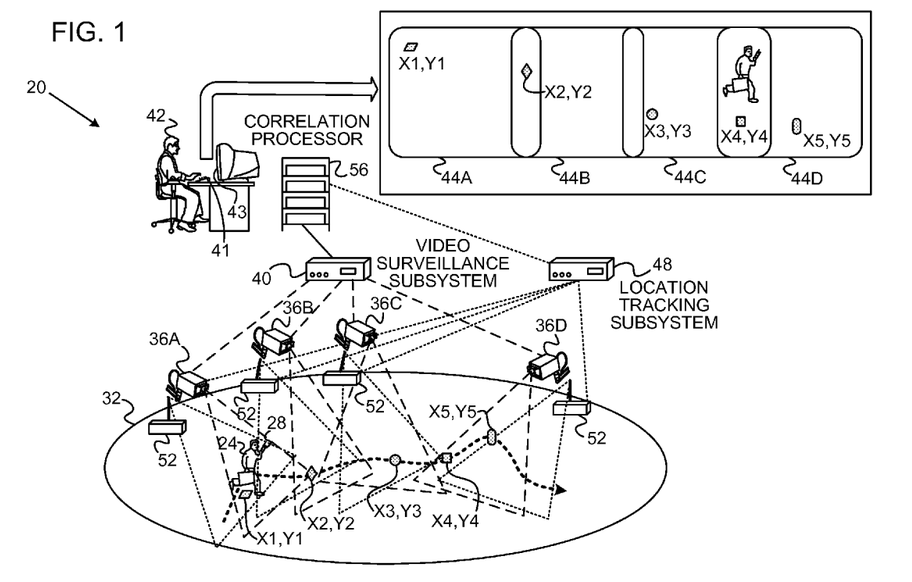
FIGS. 1 and 2 are pictorial, schematic illustrations of surveillance systems, in accordance with embodiments of the present disclosure.

FIG. 1 is a pictorial, schematic illustration of a surveillance system 20, in accordance with an embodiment of the present disclosure. System 20 monitors individuals 24, some of which may be operating wireless communication terminals 28, in a certain area of interest 32. Systems of this sort may be operated, for example, by law enforcement agencies, for applications such as anti-terrorism and crime prevention. System 20 may be deployed in any suitable area of interest, such as, for example, a neighborhood or an airport.

System 20 comprises a video surveillance subsystem, which comprises video cameras 36 and a networked video server 40. Each camera has a certain field-of-view, which covers a particular sector in area 32. The cameras capture video images of their respective sectors and send the images to video server 40. Server 40 sends the images to a control center, in which the images are presented to an operator 42 on a display 43. In the present example, system 20 comprises four cameras denoted 36A . . . 36D. Four image displays 44A . . . 44D are presented simultaneously to the operator, showing the images captured by cameras 36A . . . 36D, respectively. Alternatively, any other suitable number of cameras and image displays, as well as any other suitable way of displaying the captured images to the operator, can also be used.

System 20 further includes a location tracking subsystem, which measures the geographical locations of wireless communication terminals 28 in area 32. Terminals 28 may comprise, for example, cellular phones, wireless-enabled computers or Personal Digital Assistants (PDAs), or any other suitable communication or computing device having wireless communication capabilities. Each terminal 28 communicates with a certain communication network (not shown in the figure). The terminals tracked by the location tracking subsystem may belong to a single communication network or to multiple networks. The networks and terminals may conform to any suitable communication standard or protocol, such as Long Term Evolution (LTE), Universal Mobile Telecommunication System (UMTS), CDMA2000 or other third generation (3G) cellular standard, Global System for Mobile communication (GSM) or Integrated Digital Enhanced Network (IDEN). Alternatively, the networks and terminals may conform to the IEEE 802.16 (WiMAX) standards or other wireless data standard.

In the example of FIG. 1, the location tracking subsystem comprises one or more interrogation devices 52 (referred to as interrogators for brevity), which are connected to a location processor 48. A given interrogator 52 establishes communication with wireless terminals 28 in a given coverage area, in order to extract identity attributes of the terminals. Each interrogator typically comprises a directional antenna, whose beam pattern (combined with the interrogator's transmission power) determines the coverage area.

A typical interrogator imitates the operation of a base station, and solicits a wireless terminal to start communicating with the interrogator. The interrogator typically communicates with the terminal for a short period of time, during which it extracts the identity attributes of the terminal. Each interrogator 52 sends the extracted identity attributes to location processor 48. For example, a given interrogator may force any terminal that enters its coverage area to perform a LOCATION UPDATE process, which reveals its identity.

Interrogation devices 52 may extract various identity attributes of the terminal, such as, for example, the terminal's International Mobile Subscriber Identity (IMSI), Temporary Mobile Subscriber Identity (TMSI), or any other suitable attribute indicating the identity of the terminal. The above-described attribute extraction functions can be carried out using known Interrogation devices, which are sometimes referred to as "IMSI catchers" or "TMSI catchers." Examples of IMSI/TMSI catching techniques are described, for example, by Strobel in "IMSI Catcher," Jul. 13, 2007, which is incorporated herein by reference, by Asokan et al., in "Man-in-the-Middle Attacks in Tunneled Authentication protocols," the 2003 Security Protocols Workshop, Cambridge, UK, Apr. 2-4, 2003, which is incorporated herein by reference, and by Meyer and Wetzel in "On the Impact of GSM Encryption and Man-in-the-Middle Attacks on the Security of Interoperating GSM/UMTS Networks," proceedings of the 15$^{th}$ IEEE International Symposium on Personal, Indoor and Mobile Radio Communications, Barcelona, Spain, Sep. 5-8, 2004, pages 2876-2883, which is incorporated herein by reference. Any of these known schemes, as well as any other suitable type of interrogator, can be used to implement interrogation devices 52. Typically, the interrogators are detached and separate from any communication network via which the wireless terminals communicate.

In some configurations, the TMSI catcher should be operated in combination with another system element (e.g., a passive probe), which translates TMSI values to IMSI values.

System 20 comprises a correlation processor 56, which correlates the video images and the location tracking estimation, so as to provide operator 42 with identification information regarding individuals that are observed in the video images.

In some embodiments, processor 56 accepts from operator 42 a notification, which indicates an individual of interest observed by the operator in the displayed video. The notification indicates a position of the observed individual within the images. This position (also referred to as an image position) may be expressed, for example, as a two-dimensional coordinate on display 43, as a pixel index in the image or in any other suitable way. The operator indicates the image position using an input device 41, such as a mouse, a trackball or a keyboard. For example, the operator may move a cursor to the image position in which the individual is observed, and then press the mouse button. Alternatively, operator 42 may indicate the observed individual's position in the displayed images to processor 56 using any other suitable means.

Processor 56 translates the image position indicated by the operator into an estimated geographical location (e.g., a geographical coordinate) of the individual. In some embodiments, processor 56 uses a predefined mapping of image coordinates (or pixel indices) into geographical coordinates. This sort of mapping translates each image position (e.g., X/Y screen coordinate or pixel index) in the field-of-view of a given camera into a respective geographical coordinate in area 32.

Processor 56 now interacts with the location tracking subsystem, in order to identify wireless communication terminals 28 that may be located in the vicinity of the observed individual's geographical location. The assumption is that a terminal located nearby this location may belong to the individual of interest. In the example of FIG. 1, processor 56 indicates the individual's geographical location (as estimated based on the operator's notification) to location processor 48, and requests processor 48 to identify wireless terminals that are located in the vicinity of this geographical location. Based on the indicated geographical location, processor 48 obtains location information from one or more interrogators 52 in order to identify the nearby terminals.

The estimated geographical location of the individual may be indicated to processor 48 in various ways, and not necessarily by reporting the screen coordinate indicated by the operator. Consider, for example, the configuration of FIG. 1 in which each interrogator is associated with a respective camera, such that the coverage area of each interrogator covers roughly the same sector as the field-of-view of the associated camera. In such a configuration, the fact that a certain wireless terminal established communication with a certain interrogator indicates with high likelihood that this terminal is located in the field-of-view of the corresponding camera. Therefore, processor 56 may indicate to processor 48 the identity of the camera in which the individual of interest was observed, and processor 48 may identify the wireless terminals that established communication with the associated interrogator. In this context, an indication that a certain terminal communicated with a certain interrogator is regarded as a sort of location estimation, since this indication implies that the terminal in question was located within the known and confined coverage area of the interrogator.

In alternative embodiments, processor 56 provides the estimated geographical coordinate of the individual to processor 48. Processor 48 selects one or more interrogators whose coverage areas contain this geographical coordinate, and identifies the terminals that established communication with these interrogators.

As noted above, interrogators 52 extract identity attributes (e.g., IMSI) from the wireless terminals they communicate with. The interrogators report the extracted identity attributes to processor 48, which in turn may report them to processor 56 in response to queries.

In summary, processor 56 requests the location tracking subsystem to identify wireless terminals located in the vicinity of the determined geographical location of the observed individual. In response to the request, the location tracking subsystem identifies such nearby terminals and reports their identity attributes (e.g., IMSI) to processor 56.

Processor 56 obtains identification information of the nearby terminals using the identity attributes reported by the location tracking subsystem. For example, processor 56 may query various databases using the reported IMSI, and retrieve various kinds of information regarding the wireless terminal and/or its subscriber. Identification information may comprise, for example, the telephone number assigned to the terminal, subscriber details such as name, address, credit card details, driving license details, nationality, passport number, and/or any other kind of identification information related to the terminal or its subscriber. In some embodiments, processor 56 may communicate with remote databases, external to system 20, for this purpose.

In many practical scenarios, individuals involved in hostile activities attempt to evade surveillance by carrying mobile phones that are not registered to their own names. In such cases, the retrieved identification information per-se will often be of little value. In some embodiments, processor 56 evaluates the retrieved identification information, and may determine that the terminal in question is suspicious. The processor may report this suspicion to the operator. Processor 56 may apply any suitable criteria for determining whether a certain terminal is suspicious. For example, processor 56 may regard as suspicious terminals subscribed in hostile countries. Country information can be extracted, for example, from a country code that is part of the terminal's IMSI.

Correlation processor 56 presents the retrieved identification information to operator 42 using display 43. The identification information may be projected onto the displayed image of the individual, or displayed in any other suitable way. In some cases, the location tracking subsystem identifies and reports multiple terminals 28 as possible candidates that may belong to the individual of interest. In such cases, processor 56 may present the identification information of any desired subset of these candidate terminals, or even of all candidate terminals.

Interrogators 52 may be operated in a free-running manner or on an on-demand basis. In free-running operation, each interrogator attempts to establish communication with any terminal in its coverage area, and capture the terminal's identity attributes, regardless of any request or trigger. The interrogators (or processor 48) record the extracted identity attributes and report them as needed. In on-demand operation, processor 48 triggers a given interrogator (or multiple interrogators) in response to a specific request from processor 56.

Interrogators 52 may be active or passive. In active operation, which is typical of interrogators that capture the terminal's IMSI, the interrogator proactively initiate a communication session with the terminals in its coverage area. In passive operation, which is common of interrogators that capture the terminal's TMSI, the interrogator passively monitors the terminal's operation without actively communicating with it. The techniques described herein can be implemented using active and/or passive interrogators.

Figure 2:
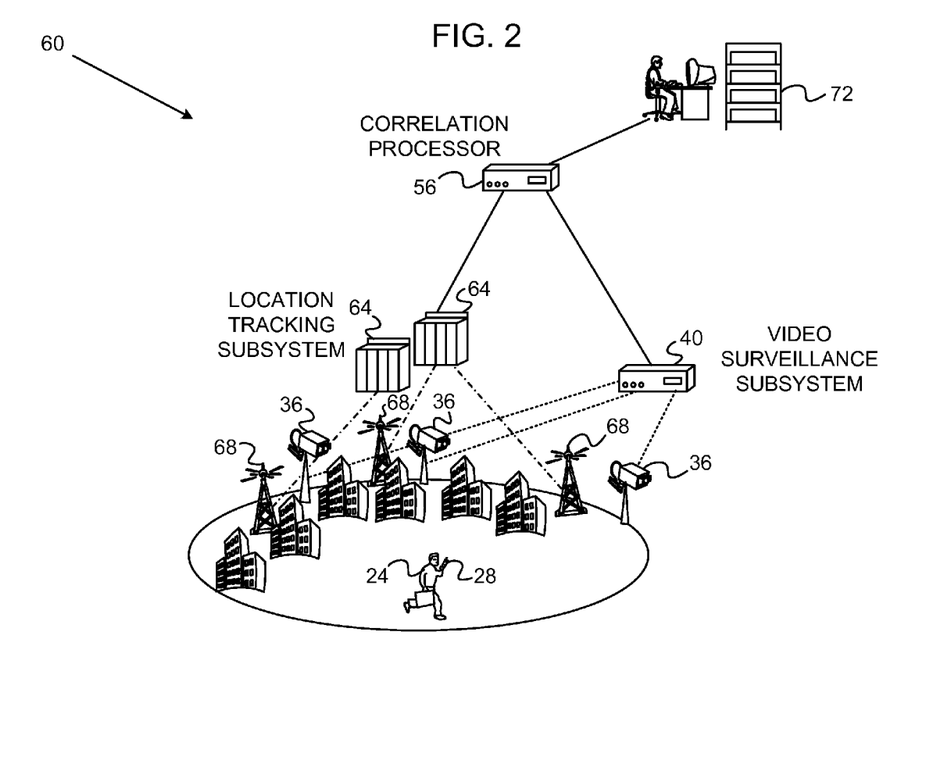

FIG. 2 is a pictorial, schematic illustration of a surveillance system 60, in accordance with an alternative embodiment of the present disclosure. Unlike system 20 that uses dedicated interrogators, system 60 uses location measurements acquired by one or more location tracking subsystems, which are part of the communication network with which terminals 28 communicate. The location tracking subsystem may apply any suitable location tracking technique available in the network, or a combination of such techniques, in order to measure terminal locations. Some location tracking techniques, referred to as network-based techniques, are carried out by base stations 68 and other network-side components of the network, without necessarily using special hardware or software in terminals 28. Other location tracking techniques are terminal-based, i.e., use special hardware or software in wireless terminals 28. Some examples of location tracking techniques that can be used for this purpose are described in U.S. patent application Ser. No. 12/497,799, filed Jul. 6, 2009, whose disclosure is incorporated herein by reference.

The location tracking techniques may be passive or active. Passive techniques perform unobtrusive probing of the signaling information transmitted in the network, and extract location information from the monitored signaling. Active techniques, on the other hand, proactively request the network or the terminal to provide location information. Typically although not necessarily, passive techniques are deployed in a massive, non-selective manner and produce large numbers of location records. Active techniques are typically deployed in a selective, on-demand manner. Active techniques are sometimes carried out by a Gateway Mobile Location Center (GMLC) of the communication network. In some embodiments, an active technique can be triggered to locate a terminal that has been identified in the area of interest by a passive technique. This feature often involves defining the area of interest as a separate "location area" in the location tracking subsystem, so as to cause the terminal to initiate a LOCATION UPDATE.

In the present example, system 60 comprises passive probes 64, which intercept communication events occurring in the network and extract location information from these events. Alternatively, however, system 60 can be implemented using any other location tracking technique, such as the techniques described above. The location information provided by the location tracking subsystem comprises identity attributes of the terminals, such as IMSI or TMSI.

In system 60, correlation processor 56 accepts a notification from the operator of a control center 72, indicating an individual of interest observed in the video images produced by the video surveillance subsystem. The notification indicates the image position of the individual, as described in FIG. 1 above. Correlation processor 56 estimates the geographical location of the individual, and identifies one or more wireless terminals located in the vicinity of this geographical location. Processor 56 identifies the terminals using the location information provided by probes 64. In some embodiments, processor 56 may request the location tracking subsystem to identify and report terminals that are located in the vicinity of the observed individual. Alternatively, processor 56 may receive non-filtered location information from the location tracking subsystem, and identify the wireless terminals that are nearby the observed individual.

Having identified one or more terminals 28 whose location is adjacent to the individual observed in the video images, processor 56 extracts the identity attributes (e.g., IMSI) of these terminals. Processor 56 obtains identification information of the terminals and/or their subscribers based on the extracted identity attributes. The identification information is presented to the operator, as described above.

Typically although not necessarily, configurations based on interrogators are particularly suitable for relatively small and confined areas of interest, such as airports. Interrogator-based configurations are often capable of providing cell-id (referring to their own antenna) location estimation, and are independent of external elements such as cellular network providers. Configurations based on network resources are generally more suitable for larger areas, such as in a crime prevention application that covers an entire city.

The configurations of FIGS. 1 and 2 are example configurations, which were selected purely for the sake of conceptual clarity. In alternative embodiments, any other suitable system configuration can also be used. For example, a surveillance system may use both dedicated interrogators and location tracking resources of the communication network.

Figure 3:
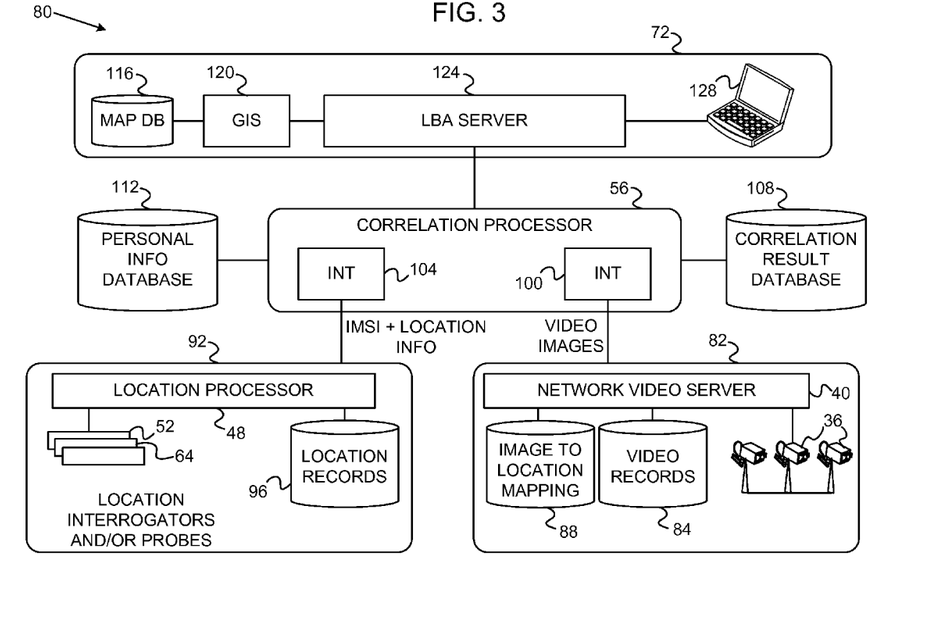
FIG. 3 is a block diagram that schematically illustrates a surveillance system, in accordance with an embodiment of the present disclosure.

FIG. 3 is a block diagram that schematically illustrates a surveillance system 80, in accordance with an embodiment of the present disclosure. A system configuration of this sort can be used to implement system 20 of FIG. 1 above, or system 60 of FIG. 2 above. System 80 comprises a video surveillance subsystem 82, which comprises multiple cameras 36 connected to networked video server 40. Subsystem 82 comprises a video records database 84, which stores captured video footage for off-line viewing and analysis. Subsystem 82 also comprises a image-to-location mapping database 88. Database 88 stores a predefined mapping of image coordinates to geographical coordinates for each camera 36. Processor 40 (or processor 56) queries this database in order to translate an image position of an individual observed in the field-of-view of a given camera into a geographical location.

System 80 comprises a location tracking subsystem 92, which comprises location processor 48, one or more interrogators 52 and/or one or more probes 64. A location records database 96 stores location records of wireless terminals, whose locations were measured by interrogators and/or probes 64. The location records comprise, in addition to the measured locations, identity attributes of the terminals.

Correlation processor 56 comprises an image interface 100 for interacting with video surveillance subsystem 82, e.g., for receiving video images for display. Processor 56 also comprises a location interface 104 for interacting with location tracking subsystem 92, e.g., for receiving location measurements and identity attributes of wireless terminals. Processor 56 stores correlation results between video images, geographical locations, terminal identity attributes and identification information in a correlation result database 108. Processor 56 obtains identification information (e.g., name, address or any other relevant information) from a personal information database 112, which can be queried using identity attributes such as IMSI.

Control center 72 comprises a map database 116 and a Geographic Information System (GIS), for presenting maps and other geographical layers to the operator. A Location-Based Application (LBA) server 124 combines the different types of information for display, e.g., map information from GIS 120, video images from subsystem 82 and identification information from correlation processor 56. The information is presented to the operator using an operator terminal 128. LBA server also transfers operator notifications regarding observed individuals to correlation processor 56. The interface between processor 56 and server 124 is thus bidirectional. Server 124 sends operator notification to processor 56, and receives from processor 56 video images for display and correlated identification information.

The configuration of FIG. 3 is an example configuration, which is chosen purely for the sake of conceptual clarity. In alternative embodiments, any other suitable configuration can also be used. In some embodiments, processors 48 and 56 and servers 40 and 124 comprise general-purpose computers, which are programmed in software to carry out the functions described herein. The software may be downloaded to the computers in electronic form, over a network, for example, or it may, alternatively or additionally, be provided and/or stored on tangible media, such as magnetic, optical, or electronic memory. Functions of processors 48 and 56 and servers 40 and 124 can be integrated and/or partitioned among any desired number of computing platforms. For example, some or all of the functions of correlation processor 56 can be integrated into LBA server 124. As another example, some of the functions of video server 48 and/or of location processor 48 can be carried out by correlation processor 56, and vice versa.

Reducing the Likelihood of False Identification

In many practical scenarios, multiple wireless terminals may be active in the vicinity of the individual of interest. Multiple nearby terminals may be detected, for example, when the mapping of image positions to geographical locations has a relatively coarse accuracy or resolution, when the location tracking subsystem measures terminal locations at a relatively coarse accuracy (e.g. cell id), and/or when additional individuals are located nearby the individual of interest.

Typically, only one of the detected nearby terminals belongs to the individual of interest, and the others are regarded as false identifications. It is generally desirable to reduce the likelihood of false identification, i.e., the likelihood of presenting identification information that is unrelated to the individual of interest. The likelihood of false identification can be reduced, for example, by narrowing the fields-of-views of cameras 36, and the coverage areas of the associated interrogators 52. A narrow coverage area will typically reduce the number of terminals identified by a given interrogator/camera pair.

Additionally or alternatively, processor 56 may reduce the likelihood of false identification by considering inputs from multiple cameras and interrogators. Consider, for example, a scenario in which the individual of interest is observed by multiple cameras. In such a scenario, processor 56 may select only terminals that are identified by two or more of the interrogators, which are associated with the cameras in which the individual was observed. Typically, only the identification information of these selected terminals is presented to the operator. These techniques are also effective in tracking moving individuals. In FIG. 1, for example, individual 24 is shown in motion and is tracked at different locations at different points in time.

Surveillance Method Description

Figure 4:
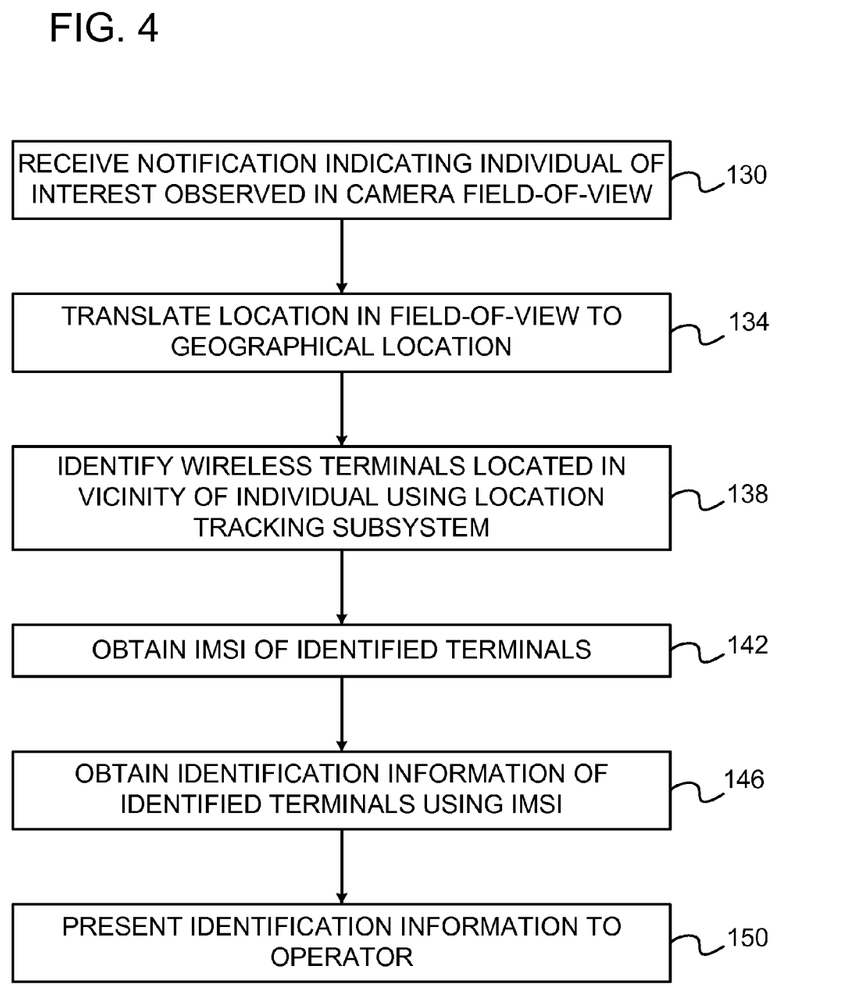
FIG. 4 is a flow chart that schematically illustrates a surveillance method, in accordance with an embodiment of the present disclosure.

FIG. 4 is a flow chart that schematically illustrates a surveillance method, in accordance with an embodiment of the present disclosure. The method begins with correlation processor 56 receiving a notification from operator 42, at a notification step 130. The notification indicates an image position (e.g., screen coordinate) of an individual of interest, which the operator observed in the displayed video. Processor 56 translates the image position into a geographical location, at a translation step 134. For this purpose, processor 56 may query a predefined mapping of image positions to geographical locations, such as database 88 of FIG. 3 above.

Processor 56 uses the location tracking subsystem to identify one or more wireless terminals that are located in the vicinity of the geographical location of the individual in question, at a terminal selection step 138. As noted above, any suitable location tracking technique can be used for this purpose, which may use dedicated interrogators and/or resources of the communication network to which the terminals belong. Processor 56 may apply various proximity criteria to determine which terminals are to be regarded as nearby the individual. For example, a proximity criterion may take into account the measurement accuracy of the location tracking technique being used.

Processor 56 extracts the IMSI (or other identity attributes) of the selected terminals from the location information provided by the location tracking subsystem, at an IMSI extraction step 142. Using the extracted IMSI of a given terminal, processor 56 obtains identification information regarding the terminal and/or its subscriber, at an information retrieval step 146. This information can be retrieved, for example, from database 112 of FIG. 3 above. Processor 56 presents the retrieved identification information to the operator, at a presentation step 150. In some embodiments, LBA server 124 presents the operator with a map display, over which the identified terminal locations and associated identification information are projected. The operator may take any appropriate action with respect to the observed individual in response to the displayed identification information.

In a system comprising multiple interrogators, once the operator has pointed to the individual of interest, the system may determine a set of cameras in which this individual appears. A corresponding set of interrogators can be triggered, such that each interrogator produces a list of IMSIs identified in its coverage area. For each camera in the set, the system selects one or more IMSIs whose estimated location is in the vicinity (e.g., within a certain radius) of the geographical location of the individual. The system then determines the intersection of the IMSI lists, i.e., the one or more IMSIs that appear in all the lists. The intersection of the ISMI lists forms the result set, whose identification information is subsequently presented to the operator. In some embodiments, IMSIs that appear in a certain number of the lists, but not necessarily in all the lists, can be regarded as belonging to the result set.

The embodiments described herein refer mainly to real-time operation, in which the displayed video reflects live events as they occur, and in which the operator is provided with identification information in real time. Alternatively, however, the methods and systems described herein can also be applied in off-line applications. For example, video footage that is stored in database 84 can be analyzed off-line using the disclosed techniques.

The embodiments described herein refer mainly to stationary video cameras, i.e., cameras whose field-of-view is fixed. Alternatively, however, the methods and systems described herein can also be used with non-stationary camera, such as scanning cameras or cameras having multiple switchable fields-of-view. Some system elements, such as mapping database 88, should be adapted to account for such field-of-view variations. Moreover, the methods and systems described herein are not limited to video cameras, and can be used with cameras that produce still images, as well. Although the embodiments described herein refer to networked video cameras that are controlled by a video server, the disclosed methods and systems can be implemented using autonomous cameras, as well.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A system, comprising:
a first interface, which is operative to receive images from more than one camera in a set;
a second interface, which is operative to receive location information from a location tracking subsystem with respect to locations of wireless communication terminals; and
a processor, which is configured to accept a notification pointing to an individual observed in the images, to identify, based on the location information received via the second interface, one or more of the wireless communication terminals located in a vicinity of the individual, wherein for each camera in the set, the system selects one or more wireless communication terminals whose estimated location is in the vicinity wherein a set of multiple interrogators can be triggered, such that each interrogator produces a list of identity attributes for each wireless communication terminal identified in its coverage area, wherein each interrogation device is associated with a respective camera, and has a coverage area that matches a field-of-view of the camera, wherein the system then determines the intersection of the location of the one or more wireless communication terminals that appear in all the cameras, thereby obtaining identification information applicable to the individual based on at least one of the identified wireless communication terminals, and wherein the terminal is determined to be suspicious based on the location; and wherein the processor is configured to extract identity attributes of one or more of the identified wireless communication terminals from the location information, and to retrieve the identification information responsively to the extracted identity attributes.

2. The system according to claim 1, wherein the notification indicates a position within the images in which the individual is observed, and wherein the processor is configured to translate the position into an estimated geographical location of the individual and to identify the wireless communication terminals in the vicinity of the individual based on the estimated geographical location.

3. The system according to claim 1, wherein the identity attributes comprise at least one attribute type selected from a group of types consisting of an International Mobile Subscriber Identity (IMSI) and a Temporary Mobile Subscriber Identity (TMSI).

4. The system according to claim 1, wherein the identification information of a given wireless communication terminal comprises personal information related to a subscriber of the given wireless communication terminal.

5. A system, comprising:
more than one camera which are operative to produce images;
an operator terminal, which is configured to display the images to an operator and to accept from the operator a notification pointing to an individual observed in the images; and
a processor, which is configured to accept location information from a location tracking subsystem with respect to locations of wireless communication terminals, to identify, based on the location information, one or more of the wireless communication terminals located in a vicinity of the individual, wherein for each camera in the set, the system selects one or more wireless communication terminals whose estimated location is in the vicinity wherein a set of multiple interrogators can be triggered, such that each interrogator produces a list of identity attributes for each wireless communication terminal identified in its coverage area, wherein each interrogation device is associated with a respective camera, and has a coverage area that matches a field-of-view of the camera, wherein the system then determines the intersection of the location of the one or more wireless communication terminals that appear in all the cameras, thereby obtaining identification information applicable to the individual based on at least one of the identified wireless communication terminals, and wherein the terminal is determined to be suspicious based on the location; and wherein the interrogation devices are configured to extract from the communication identity attributes of the wireless communication terminals in the vicinity of the individual and to provide the identity attributes to the processor, and wherein the processor is configured to retrieve the identification information responsively to the extracted identity attributes.

6. The system according to claim 5, and comprising an interface, which is operative to receive the location information from at least one communication network with which the wireless communication terminals communicate.

7. The system according to claim 5, and comprising one or more interrogation devices, which are detached from any communication network with which the wireless terminals communicate, and which are configured to establish communication with the wireless communication terminals in the vicinity of the individual so as to produce the location information, and to provide the location information to the processor.

8. The system according to claim 7, wherein the identity attributes comprise at least one attribute type selected from a group of types consisting of an International Mobile Subscriber Identity (IMSI) and a Temporary Mobile Subscriber Identity (TMSI).

9. The system according to claim 7, wherein, when the individual appears in the images produced by multiple cameras, the processor is configured to present the identification information of a given wireless communication terminal only if the given wireless communication terminal established communication with at least two of the interrogation devices associated with the cameras in which the individual appears.

\* \* \* \* \*